United States Patent Office 3,503,751
Patented Mar. 31, 1970

3,503,751
CATTLE FEED
Ralph M. Durham, 2607 22nd St., Lubbock, Tex. 79410
No Drawing. Continuation-in-part of application Ser. No. 380,053, July 2, 1964. This application Mar. 9, 1965, Ser. No. 438,382
Int. Cl. A23k 1/00
U.S. Cl. 99—2        3 Claims

ABSTRACT OF THE DISCLOSURE

A crude protein supplement made by feeding bovines a special diet of grain and protein supplement, which diet is free of fiber. Thus the bovines produce a special manure which is substantially free of fiber which provides a suitable protein supplement to be mixed with grain for feeding to cattle, swine, and chickens.

---

This is a continuation-in-part application of my patent application 380,053, filed July 2, 1964, now abandoned.

This invention relates to cattle feed and more particularly to a crude protein supplement made from special manure.

It has long been recognized that manure from farm animals was valuable as a fertilizer because of its high nitrogen content. By special feeding of ruminants, a special manure is produced which is high in crude protein thus also making it valuable as a feed. That special manure is produced by feeding a lower fiber ration.

An object of this invention is to provide a low cost feed.

Another object of this invention is to provide a feed which is high in crude protein.

A further object is to provide a feed upon which farm animals will increase in weight at low cost.

Still further objects are to achieve the above with a product which keeps well, stores well, has good nutrient qualities, yet is inexpensive and easy to manufacture and utilize.

Still further objects are to achieve the above with a method that is rapid, inexpensive, and easy for inexperienced, unskilled people to perform.

The specific nature of the invention as well as other objects, uses, and advantages thereof will clearly appear from the following description.

A certain amount of study and research has been done concerning the advisability of feeding cattle, and more particularly bovines, a concentrated diet. Success has been had feeding cattle a concentrated diet consisting entirely of grain and protein supplement in the form of cotton seed meal. A typical feeding ration would be 90% cracked sorghum grains and 10% cotton seed meal with vitamins, antibiotics, minerals, etc. mixed with the feed as is customary. In this concentrated diet, there is no roughage or bulk or fiber such as hay or grass provided to the animal. Difficulty has been experienced upon this concentrated diet when the cattle or bovines are first placed on the concentrated diet; they tend to overeat the first day or two making them sick. However, thereafter the cattle continue to eat and gain.

I have discovered that the special manure from bovines on such a concentrated diet makes a good crude protein supplement itself. The manure from bovines on such a concentrated diet will analyze between 15% and 20% crude protein and about 3% fat. By crude protein, I mean 6.25 times nitrogen analysis. The special manure is not particularly palatable and therefore, if it is used as the protein supplement from the beginning, the cattle do not tend to overeat during the first day or two, thus eliminating the initial sickness. Although commercially bovines dominate the field, the special manure may be produced by other ruminants.

After the program is begun, the concentrated diet consists of 90% grain, 10% manure with the added minerals, vitamins, and antibiotics, etc.

I have also found that this special manure is extremely useful as a crude protein supplement to other feed besides the feed back to the bovines. In fact, it seems to be even better on a cross feeding operation, i.e., the manure from bovines to be fed to chickens or pigs. I do not understand this particularly, but it might be from the fact that the bovine has derived the principal value desirable for bovine from it whereas the fowl and swine (having a different digestive system) are able to derive additional value from it.

As stated before, if cattle are first put on a concentrated diet consisting of 90% grain and 10% crude protein supplement (special manure) with the added vitamins, minerals, and antibiotics they do not tend to become ill. Although I analyze this primarily because they do not overeat during the first day or two, it is also speculative that it may be they have introduced into their systems certain bacteria or microorganism from the special manure which aid in the digestion of the concentrated diet.

Also, it will be recognized that when we speak of feeding animals, we are speaking of feeding young animals to increase their weight and prepare them for slaughter.

As used herein, I intend for the term "grain" to mean those grains commonly and ordinarily fed to bovines such as the grain from grain sorghum plants, grain from corn, the grain from oats, wheat, rye, barley, or kaffir. When I speak of protein supplement for feed, I am speaking of an additive to the feed which has protein analysis of over 15% crude protein.

Further the exact ratio of grain to crude protein supplement is not critical and although generally the ratio of 90:10 is used this may be varied widely and still produce manure according to this invention. The feed when mixed should contain 10% to 15% crude protein. Most important is that the ration contains little fiber and consequently the manure is very low in fiber.

The special manure produced by the concentrated diet is a completely different product from ordinary manure. This special manure has a very low percentage of fiber in it. Therefore, having practically no fiber, the product has practically no water holding capacity. Therefore, it is not necessary to artificially dry the product. Having no water holding capacity, it is practically self-drying and therefore, it is very easy to process. It will form a sheet or layer or slab on the feed lot floor or pavement where normal manure will be formed in piles (called chips when dry). The special manure, lacking fiber, will more flow into a sheet and form a homogenous layer, homogeneously bonded together. Inasmuch as there is very little or no fiber in it, there are no lumps or aggregates.

Expressed otherwise, the very low fiber content results in three characteristics. First, without the fiber to dilute the more beneficial ingredients, the special manure will have a high crude protein and fat content in analysis. Second, without fiber, the special manure forms homogeneous sheets or layers or smooth cake-like material rather than lumps, piles, etc. Third, without the fiber, the special manure has very low water holding capacity which causes it to dry fast and dry completely in the feed lot therefore eliminating the necessity for artificial drying. This avoidance of artificial drying makes the product commercially feasible. Were it necessary to go to the expense of artificial drying of the product, the product might not be economically feasible.

To utilize the special manure, it is left in the feed lot until sun dried. Then it is scooped up and ground in a conventional feed mill. It may be stored in bags or in a bin until fed. When fed, 90% grain is cracked and mixed with 10% special manure with what extra vitamins, minerals, etc. are desired. The mixed feed is then fed to cattle, swine, or fowl. The grain manure ratio is not critical and may be varied widely.

It will be apparent that the embodiment shown is only exemplary and that various modifications can be made in construction, materials, and arrangement within the scope of the invention as defined in the appended claims.

I claim as my invention:

1. The method of producing feed for animals comprising the steps of:
   (a) feeding bovines a fiber-free diet consisting substantially, solely of grain, crude protein supplement, vitamins and trace minerals,
   (b) said diet containing between 10 and 15% crude protein,
   (c) collecting the manure from said bovines, and
   (d) mixing, as the only protein supplement, the manure as collected from said bovines with grain thus forming feed.

2. A crude protein supplement having
   (a) (i) between 15% and 20% crude protein, (ii) about 3% fat, and (iii) practically no fiber,
   (b) said protein supplement being adapted to be mixed with grain for feed to livestock and poultry,
   (c) said protein supplement being dry, whole manure from bovines which have been fed a diet consisting substantially solely of 90% grain and 10% protein supplement having a crude protein content of between 15% and 20%.

3. An animal feed consisting substantially solely of 10% crude protein supplement as defined in claim 2 mixed with 90% grain.

References Cited

UNITED STATES PATENTS 3,375,116  3/1968  Anthony _____ 99—2

OTHER REFERENCES

Anthony et al., Feeding Potential of Reclaimed Fecal Residue. Journal of Dairy Science 45: 1538–9 December 1962.

Morrison, Feeds and Feeding, The Morrison Publishing Co., Ithaca, N.Y. 21st ed. 1951, pp. 1169–1173 and 640–642. SF95M64 1948.

Lederle, "Anaimal Protein Factor in Poultry and Swine Nutrition," A.P.F. Feeding Supplement-Lederle Labs Div., American Cyanamid Co., pp. 19, 22, September 1950.

Bulletin 466, "Cow Manure Helps Pigs on Soybean and Tankage Rations," What's New in Science—Annual Report of the Director of the Experimental Station. Univ. of Wisconsin, p. 52, May 1945.

A. LOUIS MONACELL, Primary Examiner

J. M. HUNTER, Assistant Examiner

U.S. Cl. X.R.

99—4, 7